United States Patent
Böing et al.

[11] Patent Number: 6,082,221
[45] Date of Patent: *Jul. 4, 2000

[54] TWO-PIECE HOUSING AND METHOD FOR ITS MANUFACTURE

[75] Inventors: Georg Böing; Hans-Albert Schaupp, both of Rottenburg; Wolfgang Schnurr, Nehren; Robert Stoll, Tübingen, all of Germany

[73] Assignee: Flender-Himmelwerk GmbH, Tübingen, Germany

[*] Notice: This patent issued on a continued prosecution application filed under 37 CFR 1.53(d), and is subject to the twenty year patent term provisions of 35 U.S.C. 154(a)(2).

[21] Appl. No.: 09/054,880

[22] Filed: Apr. 3, 1998

[30] Foreign Application Priority Data

Apr. 11, 1997 [DE] Germany .............. 197 15 016

[51] Int. Cl.[7] .................................................. F16H 57/02
[52] U.S. Cl. .......................................... 74/606 R; 74/7 A
[58] Field of Search .................. 74/606 R, 7 A; D15/148, 149; 475/248

[56] References Cited

U.S. PATENT DOCUMENTS

| | | | |
|---|---|---|---|
| D. 288,821 | 3/1987 | McDonald | D15/148 |
| D. 368,919 | 4/1996 | Lannoch | D15/148 |
| D. 377,657 | 1/1997 | Winters | D15/149 |
| D. 403,004 | 12/1998 | Kaye | D15/149 |
| 2,669,881 | 2/1954 | Skidmore | 74/606 R |
| 2,888,831 | 6/1959 | Malcom | 74/421 |
| 3,422,695 | 1/1969 | Wilson et al. | 74/421 |
| 3,710,646 | 1/1973 | Bogan | D15/148 X |
| 4,362,065 | 12/1982 | Baratti | 74/7 A |
| 4,441,378 | 4/1984 | Ponczek | 74/414 |
| 5,171,195 | 12/1992 | Funamoto | 74/606 R |
| 5,447,078 | 9/1995 | Robinson et al. | 74/606 R |
| 5,566,591 | 10/1996 | Burkett | 74/606 R |
| 5,823,907 | 10/1998 | Teraoka et al. | 74/606 R |

*Primary Examiner*—Vinh T. Luong
*Attorney, Agent, or Firm*—Max Fogiel

[57] ABSTRACT

A two-piece housing is provided with several bores (3, 4) which extend through the two housing sections (1, 2). Each bore (3, 4) is concentrically surrounded by a centering in each housing section (1, 2), which is in the shape of an internal centering in one housing section and an external centering in the other housing section. These bores (3, 4) are manufactured in each housing section (1, 2) together with the respective concentrically surrounding centering and in one process step with a drilling tool which includes two cutters (8, 9, 10) adapted to the diameters of the bore and the centering respectively. Subsequently, the housing sections (1, 2) provided with the bores (3, 4) and centerings are assembled in such a way that the centerings fittingly interengage. (FIG. 1)

3 Claims, 3 Drawing Sheets

TWO-PIECE HOUSING AND METHOD FOR ITS MANUFACTURE

BACKGROUND OF THE INVENTION

Housings of this type are preferably used as gear housings, whereby the coaxial bores receive a shaft which carries a gear and which is supported in both housing sections. To this end, both housing sections must be mutually positioned so that the axes of the coaxial bores are positioned relative to each other with high accuracy. This high accuracy of position has so far been achieved with a fitting pin connection. The housing sections are thereby first preprocessed, then bolted together and, subsequently, the pin bores and the further bores are made. However, this process results in a very high manufacturing cost and, furthermore, must be interrupted for the bolting together of the housing sections:

Drilling tools are known (DE-PS 36 10 016. DE-PS 41 20 436), which include several cutting plates of different diameter which are axially spaced. Stepped bores can be manufactured in a single process step with such drilling tools.

SUMMARY OF THE INVENTION

It is an object of the invention to design and manufacture the conventional two-part housing provided with coaxially bores in such a way that a high positioning accuracy is achieved at lower manufacturing costs.

The housing sections of the housing designed in accordance with the invention can be separately manufactured and, subsequently, fittingly assembled by way of a centering which is in the form of an internal centering and an external centering. The bore and the centering are achieved in each separately manufactured housing section with high accuracy by using a drilling tool with two cutting members.

BRIEF DESCRIPTION OF THE DRAWINGS

The preferred embodiment of the invention is shown in the drawings and is described in more detail in the following. It shows.

DESCRIPTION OF THE PREFERRED EMBODIMENTS

Figure 1:
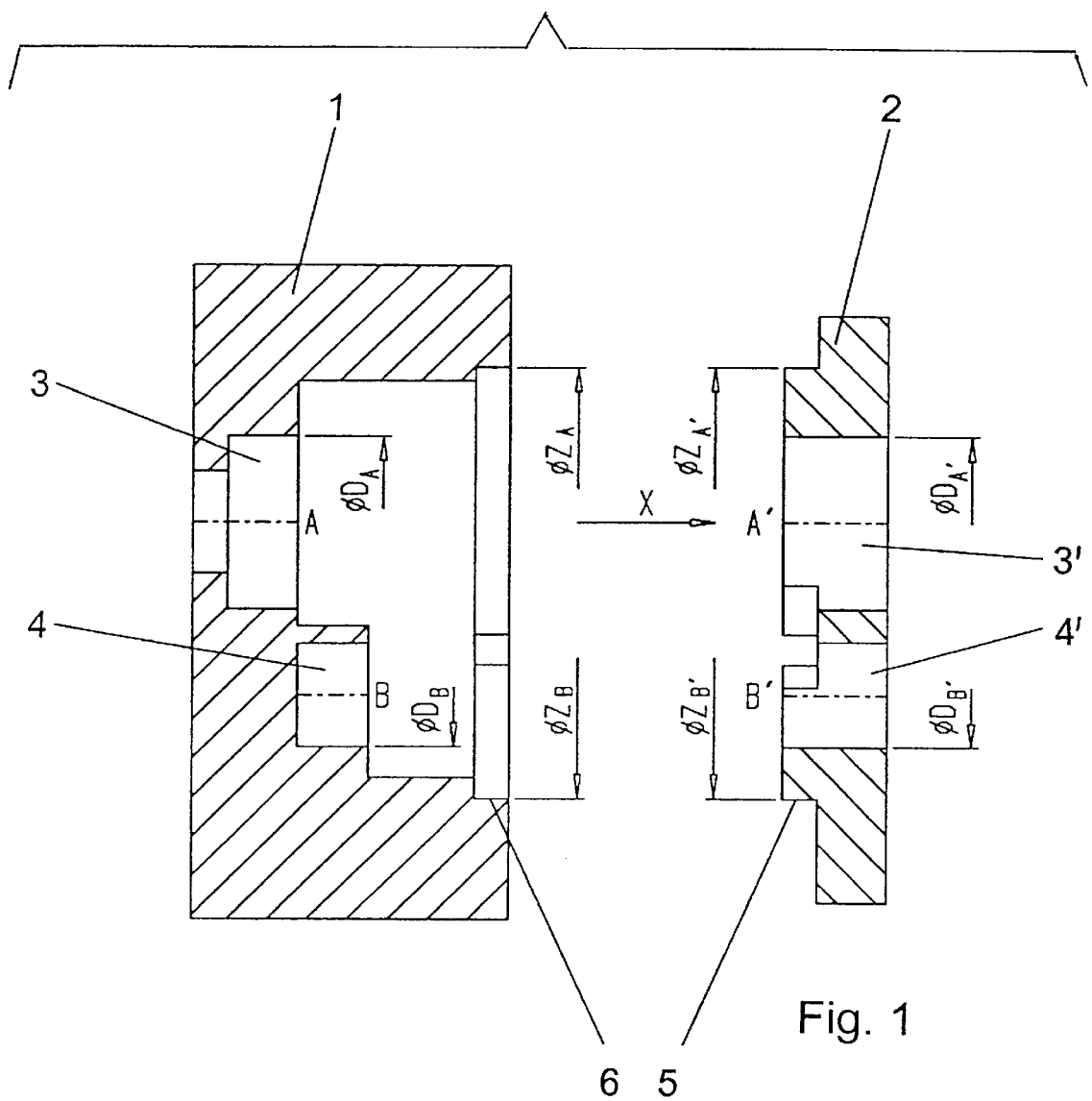
FIG. 1a longitudinal section through two housing sections of a two-piece housing.

The illustrated housing which preferably is a gear housing, is made of two parts and consists of housing sections 1 and 2. These housing sections 1 and 2 are shown in the drawing in spaced apart condition. The housing is provided with two bores 3, 4 which are intended to support a shaft that is not illustrated and which carries a gear (not illustrated). The shaft is supported in both housing sections so that the axis A of the upper bore 3 with diameter $D_A$ in the left housing section 1 is coaxial with the axis A' of the upper bore 3' with the diameter $D_A$ of the same size in the right housing section 2. In the same manner, axis B of the lower bore 4 with diameter $D_B$ in the left housing section 1 and the axis B' of the lower bore 4' with diameter $D_B$ of equal size in the right housing section 2 are oriented coaxially to each other.

In order to be able to fit the two housing sections 1, 2 together with high accuracy of fit of the axes A—A' and B—B' relative to each other, each bore 3, 4 is concentrically surrounded by a centering in the shape of a circle or a circular segment 5'. The centerings $\phi Z_{A'}$ and $\phi Z_{B'}$ with diameters $Z_{A'}$ and $Z_{B'}$ which surround the bores 3, 4 in the right housing section 2 are constructed as external centerings in form of a protrusion 5 The centerings $\phi Z_A$ and $\phi Z_{B'}$ in the left housing section 1 are formed as internal centerings with diameters $Z_A$ and $Z_B$ in form of a recess 6 into which the protrusion 5 can be fittingly inserted. Other than shown in the drawing, the right housing section 2 can be provided with internal centerings and the right housing section 1 with external centerings. It is also possible, for example, in the right housing section 2 to provide the bore 3 with an external centering and the bore 4 with an internal centering. Correspondingly, the bore 3 in the left housing section 1 would be surrounded by an internal centering and the bore 4 by an external centering.

Figure 2:
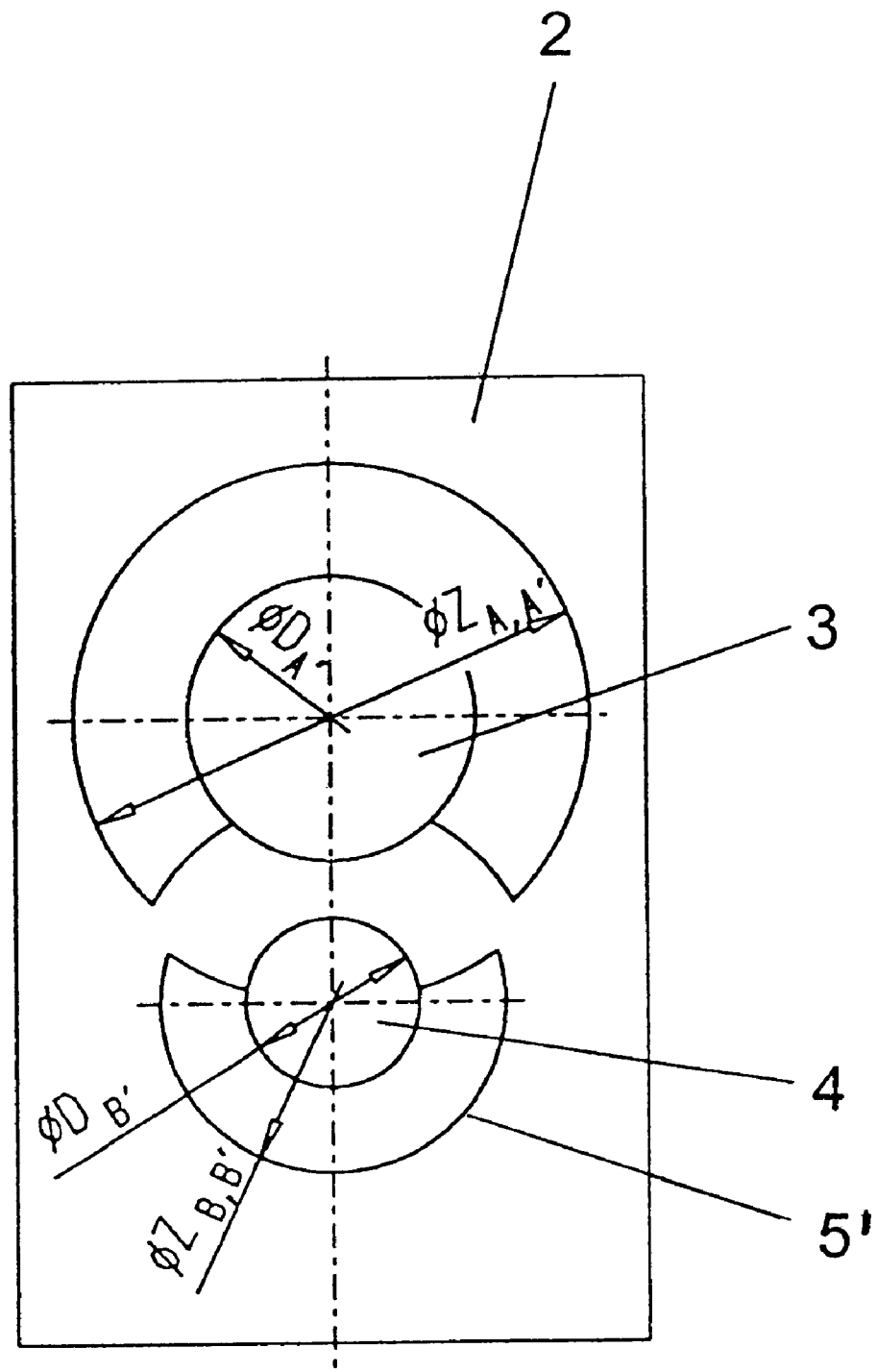
FIG. 2a plan view of a housing section in direction of view X.

The centerings which surround the bores 3, 4 an extend over the complete circular circumference. It is thereby possible, depending on the diameter of the centerings, that the centerings partly overlap and are destroyed during manufacture in the overlapping areas. As shown in FIG. 2, the centerings can also extend over a circular segment only and can be positioned as segments on the housing sections 1, 2.

Figure 3:
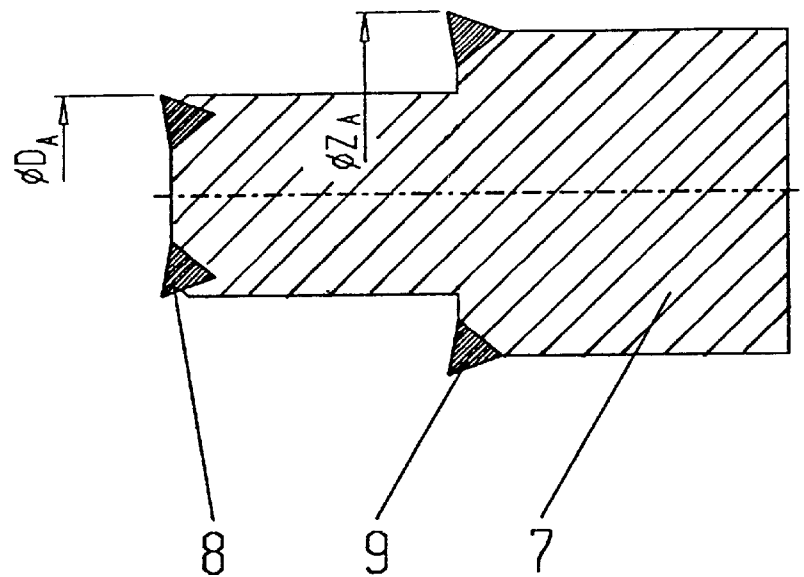
FIGS. 3 and 4 a longitudinal section through a drilling tool respectively.
Figure 4:
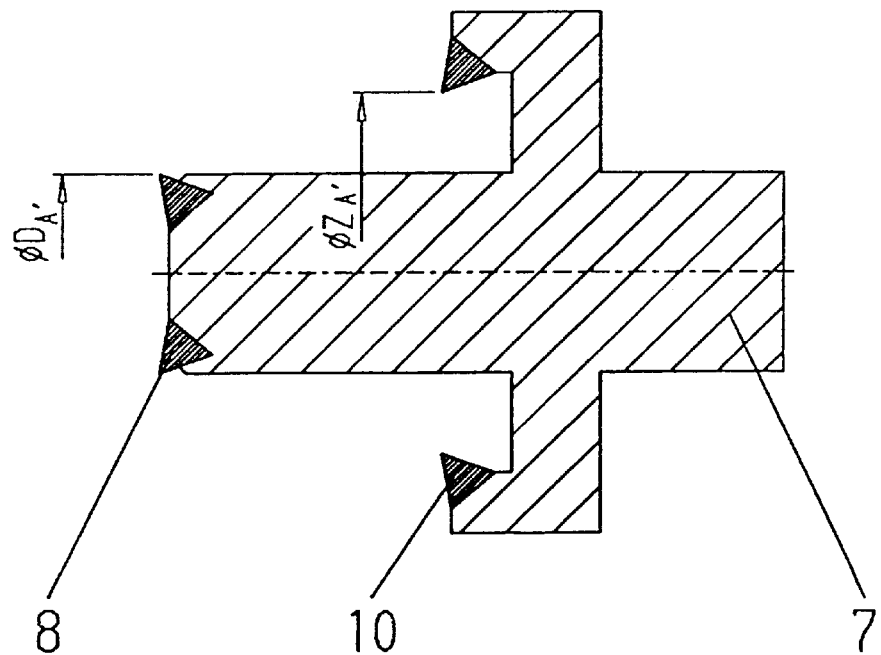

The drilling tool according to FIG. 3 is intended for manufacture of the bore 3 in the housing section 1. This drilling tool consists of a shaft 7 at which tip the first cutter 8 is provided. The cutter 8 has an outer diameter which corresponds to the diameter $D_A$ of bore 3. Shaft 7 of the drilling tool at a distance from its tip Is provided with a second cutter 9, the outer diameter of which corresponds to the diameter $Z_A$ of the internal centering which surrounds the bore 3. The distance of the cutting edge of the first cutter 8 from the cutting edge of the second cutter 9 corresponds to the distance of the bottom of bore 3 from the bottom of cutout 6. The drilling tool shown in FIG. 4 is similarly constructed in this case, a first cutter 8 is provided as well which has an outer diameter corresponding to the diameter $D_A$ of the bore 3 in the right housing section. The second cutter 10 is however formed as a hollow cutter and has an inner diameter corresponding to the outer diameters $Z_A$ of the external centering surrounding the bore 3.

The manufacture of the housing is carried out in such a way that by using the drilling tool illustrated in FIG. 3, the bore 3 in the housing section 1 is manufactured in the same process step as the internal centering surrounding the bore 3. The bore 4 and the internal centering surrounding it are manufactured with a similar drilling tool which is however adapted to the preselected dimensions. The housing section 2 is manufactured separately from the housing section 1, whereby the bore 3 and the external centering surrounding it are made in one manufacturing step by way of the drilling tool illustrated in FIG. 4. The bore 4 and the external centering surrounding it are manufactured with a similar drilling tool which is however adapted to the preselected dimensions. Subsequently, the two housing sections 1, 2 are fitted together so that the external centerings engage the internal centerings. Since two bores 3, 4 are provided and each of bores 3, 4 are provided with an internal or external centering, this results overall in a dual centering of the housing sections 1 and 2. Since the bores 3, 4 and their centerings are respectively made with a single tool, a high accuracy of positioning of both elements is achieved. The fitting together of the housing sections by way of the centerings results thereby in a high accuracy of the positioning of the axes A—A' and B—B' relative to each other.

The simultaneous manufacture of bore and centering does not result in additional manufacturing costs.

What is claimed is:

1. A housing comprising a first housing section and a second housing section; each said housing section having at least two bores, each of said bores having an axis; the axis of each of said bores in said first housing section being coaxial with the axis of one of said bores in said second housing section; centering means surrounding each bore in each housing section, said centering means comprising an outer centering and an inner centering; said outer centering being a projection and surrounding one of said bores in said first housing section; said inner centering being a recess surrounding the bore in said second housing section whose axis is coaxial with the axis of said bores in said first housing section, said projection and said recess fitting precisely coaxially into one another.

2. A housing as defined in claim 1, wherein said inner centering is located in said first housing section and said outer centering is located in said second housing section.

3. A housing as defined in claim 1, wherein said outer centering and said inner centering comprise segments on said housing sections.

* * * * *